United States Patent Office 3,475,410
Patented Oct. 28, 1969

3,475,410
TREATMENT OF A FILM OF CELLULOSE TO INTRODUCE AMINO GROUPS AND PRODUCTION OF NON-THROMBOGENIC SURFACES ON SUCH TREATED CELLULOSE FILMS
Robert A. Britton, Cambridge, Mass., assignor to Massachusetts Institute of Technology, Cambridge, Mass., a corporation of Massachusetts
No Drawing. Filed Feb. 8, 1967, Ser. No. 614,565
Int. Cl. C08b 15/06
U.S. Cl. 260—212                               9 Claims

ABSTRACT OF THE DISCLOSURE

This invention relates to the treatment of a film of cellulose and its derivatives to introduce amino groups, and to the production of non-thrombogenic surfaces on the film. Amination is accomplished by reacting the cellulose with ethyleneimine in a non-polar solvent, and then heparinizing the aminated (aminoethylated) film. Preceding the amination the water-wet film is brought into equilibrium with the non-polar solvent by solvent exchange steps; subsequently it is returned to the water-wet condition.

---

As noted by Merrill et al., vol. XIII Trans. Amer. Soc. Artif. Int. Organs (1966), p. 139, there is currently a need for membranes having a surface against which blood will not clot, but which, on the other hand, will not permanently anticoagulate the blood. Such membranes are useful in, for instance, artificial kidneys and heart-lung machines.

The Merrill et al. paper cited above describes proposed methods of aminating cellulose membranes with ethyleneimine; and then adsorbing heparin onto the aminated cellulose. Notwithstanding some promising results, vigorous testing of heparinized membranes thus prepared has now shown that the earlier methods of amination are not uniformly satisfactory. It is difficult to reproduce the desired extent of reaction, and the extent of reaction is very uneven apparently because areas of low molecular weight polyethyleneimine condense on the surface of the film.

The new and improved method of this invention for aminating cellulose consists in reacting the cellulose film with a nonpolar solvent solution of ethyleneimine, after first having subjected water-wet cellulose to a solvent exchange operation to render it compatible with the non-polar solvent. Following the reaction the cellulose is again subjected to solvent exchange to replace it in a water-wet condition.

Two results are attained. The cellulose film is uniformly aminated to any extent desired, up to reaction of the ethyleneimine with all available functional sites. In addition the solvent exchange operations greatly improve the physical characteristics of the film with respect to its utilization in dialysis.

A typical procedure (Case I) for carrying out the process of this invention consists in first placing a regenerated cellulose film e.g. Union Carbide #20 dialysis tubing, in distilled water and boiling for about an hour to cause the film to swell and remove the plasticizer. The film, while remaining in the water, is then cooled and placed in an intermediate solvent, such as methanol, and allowed to remain there until substantially equilibrium conditions are reached (ca. 30 min.). This procedure is repeated twice more with dry methanol (reagent grade), the end result being the substitution of methanol for water in the film structure. The film now solvated with methanol is next placed in a non-polar solvent, typically dry xylene (reagent grade), and allowed to remain there again until substantially equilibrium conditions are reached (ca. 30 min.). This is also repeated twice more, at which time the film is ready for reaction with the ethyleneimine. It is important that the methanol and xylene used for solvent exchange or for reaction solvent be essentially water-free, since an excessive concentration of hydroxyl groups present during the reaction will considerably lower the efficiency of the cellulose-ethyleneimine reaction.

In the next operation, the film is caused to react with ethyleneimine in the presence of an active chloride catalyst at an elevated temperature. The reaction is conveniently carried out in a vertical tubular glass vessel which connects with a verticaltubular water-cooled condenser. The cellulose film is held in the vessel by a length of Teflon coated nickel wire which runs the length of the condenser so that by moving the wire up and down the film may be agitated. A xylene solution of benzyl chloride is placed in the vessel, and this is then flushed for a few minutes with prepurified nitrogen. While agitating the film, the solution is heated to about 90° C., and the ethyleneimine is then added to the vessel, typically to a mole fraction concentration of 0.05. Preferably the ethyleneimine has been first freshly distilled over fused potassium hydroxide and stored under prepurified nitrogen until used. The amount of catalyst (benzyl chloride) necessary is quite small, for instance 0.1 mol of catalyst per mol of ethyleneimine. The desired degree of reaction will be complete in less than an hour, generally 20 minutes being sufficient, between 10–30 minutes being optimum, under the reaction condition of Case I. Following this the film is quenched in cold methanol and then subjected to a reverse solvent exchange operation.

The film solvated with xylene is placed in methanol and allowed to remain until substantially equilibrium conditions are reached, and then twice more bathed in methanol as before. The methanol solvated film is then placed in water, and thrice brought to equilibrium to return the film to the aqueous condition.

Preferably at this stage the film is washed in water for about one week at room temperature in order to remove any unbound homopolymer of ethyleneimine and may then be heparinized.

Typically heparinization is accomplished by soaking the film in a sodium heparin-water solution for ten to twenty minutes. Typically a concentration of 100 to 200 milligrams of sodium heparin per cc. of solution is sufficient. The film is then washed with a 0.9 percent saline solution until platelet-poor plasma which has passed in contact with the film shows a normal thrombin reaction time indicating that all unbound heparin has been removed.

The foregoing description of the process of this invention is given by way of example and is not intended to imply limitations not otherwise justified.

The preferred reaction conditions can be varied over a considerable range and still result in the same desired extent of reaction and thus the same non-thrombogenic properties. The extent of aminoethylation is somewhat critical in producing a successful non-thrombogenic membrane. The best non-thrombogenic membranes have been obtained when the aminoethylation is carried out to give nitrogen contents of 0.20 to 0.30% nitrogen by weight (Kjeldahl). If the nitrogen content is too low it results in incomplete heparin coverage and if it is too high the active sites on the attached heparin are shielded by the longer polyethyleneimine chains. The reaction conditions described above have been found to give satisfactory results. Alternatively, however, the ethyleneimine reaction conditions may be varied. For instance, (Case II) substantially similar results are had if the treatment temperature is 70° C. (instead of 90), the ethyleneimine content is 0.25 mol fraction (instead of 0.05) and the catalyst content is 0.025 mols per mol ethyleneimine (instead of 0.1).

In the first example (Case I) the nitrogen content was measured at 0.27%, the thrombin time at 15.0 sec. and the whole blood clotting time at greater than 50 minutes, by an indefinite amount. In the second example (Case II) the same figures respectively were 0.22%, 15.5 seconds and greater than 65 minutes. For a control of untreated cellulose the figures were 0, 15.0 seconds and 10 minutes.

It is contemplated that the solvent exchange operation may utilize other solvents, specifically intermediate solvents that are miscible with both water and the non-polar solvent to be utilized, and that such non-polar solvents as benzene, toluene and numerous hydrocarbons may be used in place of xylene.

The temperaures and concentrations set forth have been found to be completely satisfactory but no effort has been made to determine the ultimate ranges permissible. I have found that ethyleneimine concentrations can range from 5 to 60 mol percent but this is not presented as an absolute limit. Benzylchloride is the preferred catalyst because of its reactivity and high boiling point, but other active halide catalysts of the general form R—X may be effectively used. (R=alkyl, aryl group; X=halogen). Catalyst concentrations in the range of 0.001 to 0.200 mols of catalyst per mol of ethyleneimine have been found to be satisfactory.

In addition to cellulose, the process of this invention may also be used to treat cellulose derivatives, such as cellulose acetate after de-acetylation, for example.

According to known principles of chemical kinetics the temperature and time of reaction are interrelated. The reaction temperatures given were selected to give a reasonably fast reaction without causing thermal decomposition of the aminoethylated cellulose.

From the foregoing it will be observed that the invention is specifically concerned with an improved method of aminoethylating cellulose and cellulose derivatives, and features a reaction of the cellulose with ethyleneimine in the medium of a non-polar solvent, and also includes, as a further aspect, steps by which the film is conditioned for reaction in a non-polar medium.

Having thus disclosed my invention and described in detail the preferred embodiments thereof I claim and desire to secure by Letters Patent:

1. In the method of aminoethylating a cellulose film by reacting the film with ethyleneimine in the presence of a non polar solvent, the improvement comprising first placing the cellulose film in water to cause said film to swell and become hydrated, then contacting the hydrated cellulose film with a water-miscible solvent which is miscible with said non-polar solvent until the water is exchanged for said water-miscible solvent, contacting the cellulose film with said non-polar solvent until exchanged for said water-miscible solvent, and contacting the cellulose film containing said non-polar solvent with a non-polar solvent solution of ethyleneimine under aminoethylating conditions.

2. The method defined by claim 1 wherein an active chloride catalyst is present when said cellulose is contacted with the ethyleneimine.

3. The method defined by claim 2 wherein the active chloride catalyst is benzyl chloride.

4. The method defined by claim 1 wherein the cellulose after treatment with the ethyleneimine is equilibrated first with a water-miscible solvent and then with water, whereby the cellulose is returned to a hydrated condition.

5. The method defined by claim 4 wherein the hydrated aminoethyl-cellulose is contacted with an aqueous solution of heparin.

6. The method defined by claim 1 wherein the cellulose film is contacted with the non-polar solvent solution of about 25 mol percent ethyleneimine at a temperature of about 70° C. for from 10–30 minutes.

7. The method defined by claim 1 wherein the cellulose film is contacted with the non-polar solvent solution of about 5 mol percent ethyleneimine at a temperature of about 90° C. for from 10–30 minutes.

8. The product of the method defined by claim 4.

9. The product of the method defined by claim 5.

References Cited
UNITED STATES PATENTS

| | | | |
|---|---|---|---|
| 2,972,606 | 2/1961 | Hartman et al. | 260—91.3 |
| 2,656,241 | 10/1953 | Drake et al. | 8—116.2 |
| 2,668,096 | 2/1954 | Reeves et al. | 8—115.5 |

DONALD E. CZAJA, Primary Examiner

R. W. GRIFFIN, Assistant Examiner

U.S. Cl. X.R.

106—186; 117—143, 144; 424—185